March 16, 1943.   E. BANKS, JR   2,313,798
VALVE FOR STEAM HEATED CABINETS
Filed May 8, 1939   2 Sheets-Sheet 1
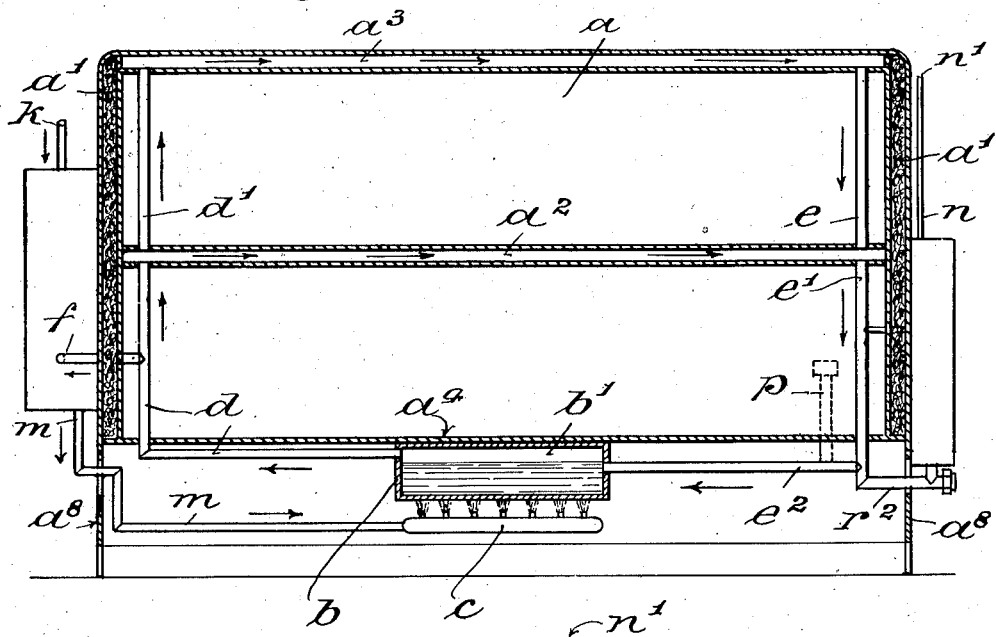
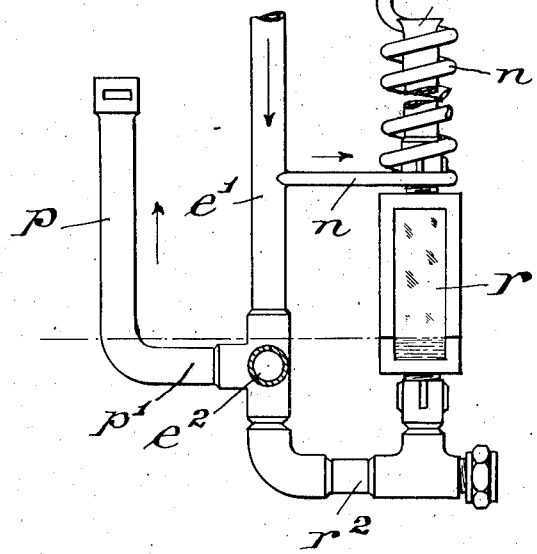
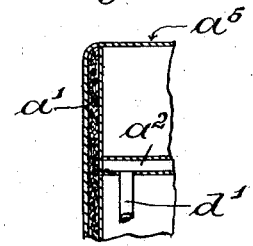
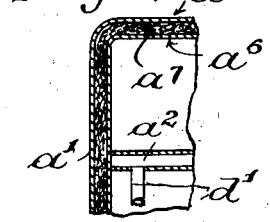
Inventor,
Edward Banks, Jr.
By E. Stevens
ATTY.

March 16, 1943.   E. BANKS, JR   2,313,798
VALVE FOR STEAM HEATED CABINETS
Filed May 8, 1939   2 Sheets-Sheet 2
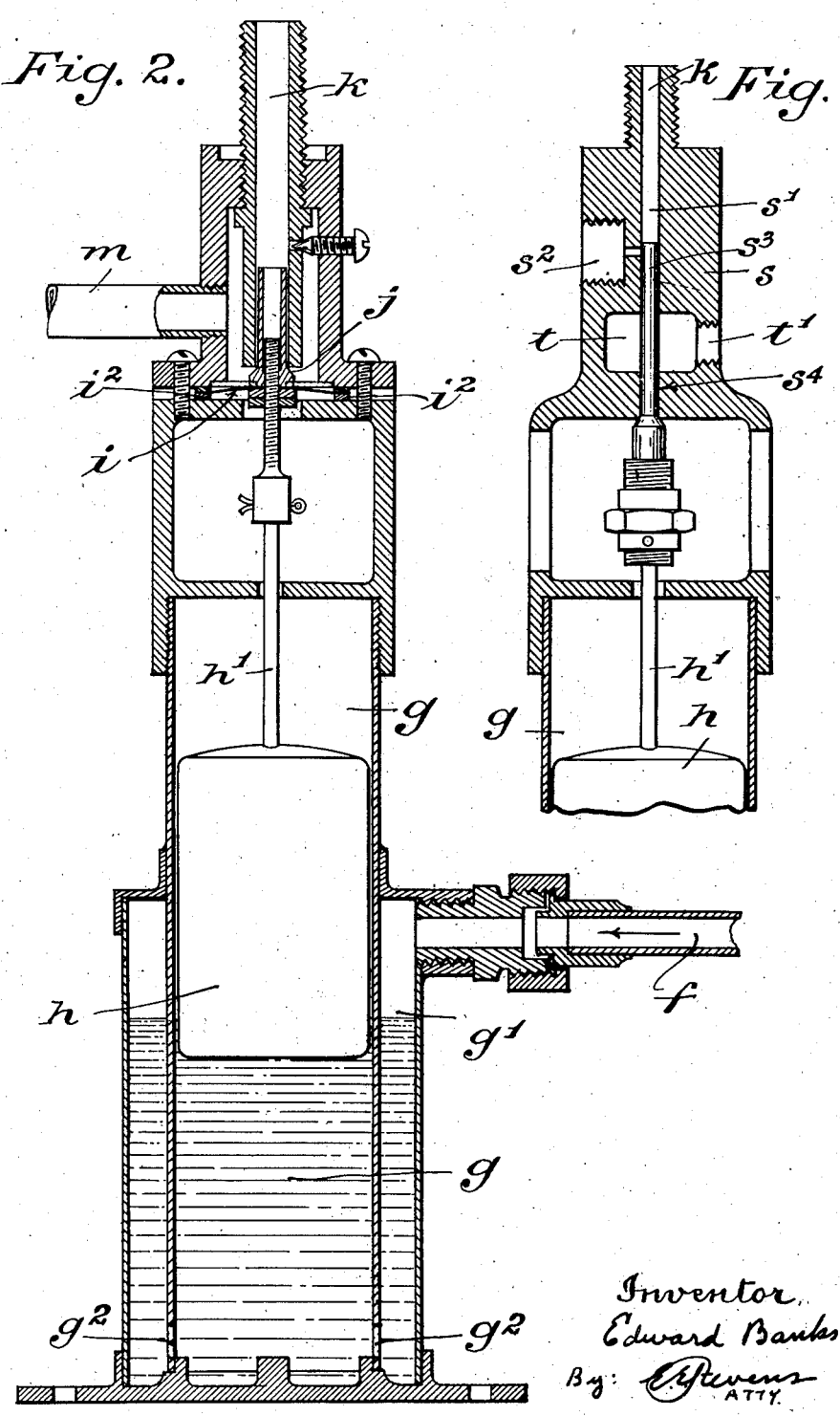
Inventor,
Edward Banks, Jr.
By: C. Stevens
ATTY.

Patented Mar. 16, 1943

2,313,798

UNITED STATES PATENT OFFICE 2,313,798

VALVE FOR STEAM-HEATED CABINETS

Edward Banks, Jr., Menston, England

Application May 8, 1939, Serial No. 272,509
In Great Britain May 19, 1938

1 Claim. (Cl. 137—153)

The invention relates to steam-heated heating and/or cooking systems or apparatus operating at very low pressures and comprising in combination a suitably-heated boiler, a steam system connected therewith and of such a character or arrangement in relation to the boiler as to provide an appropriate head for the condensate sufficient to return the latter to the boiler, a control device for the heating medium operated by the pressure in the system and functioning to regulate the supply of heating medium to the boiler in accordance with the pressure in the system and means arranged to open up the system to the atmosphere in the event of development in the system of a pressure determinedly higher than that at which the system is arranged to operate.

An object of the invention is to provide an improved steam-heated heating and/or cooking cabinet embodying the general features above outlined.

A further feature is to provide the cabinet with improved means, more sensitive than those hitherto provided in apparatus of the kind referred to, for controlling the supply of heating medium in accordance with requirements, and thus affording a more level temperature than has previously been obtainable.

A still further object is to provide improved means for opening up to atmosphere the steam space in the cabinet, in the event of building up in said space of an unduly high pressure.

A still further object is to provide means whereby appropriate indication will be given if the water level in the boiler drops too low, said means also functioning to obviate creation of a vacuum in the system and thus possible withdrawal of liquid from the means controlling the supply of heating medium, when the system is being closed down.

In the accompanying drawings,

Fig. 1 is a sectional front elevation, in more or less diagrammatic form, of a steam-heated heating and/or cooking cabinet according to the invention;

Fig. 2 shows one construction of means for controlling the supply of heating medium;

Fig. 3 shows a modified form of means for controlling the supply of heating medium;

Fig. 4 shows means for indicating the water level in the boiler, for opening up to the atmosphere the steam space in the boiler in the event of the water level dropping too low and for obviating creation of a vacuum in the system; and Figs. 5 and 6 illustrate modified arrangements which may be adopted.

Referring to the drawings, a heating and/or cooking cabinet according to the invention comprises according to the embodiment shown in Fig. 1 a casing $a$ having heat-insulated walls $a'$, $a'$, a partitioned or hollow shelf $a^2$ suitably disposed between the top and bottom of the cabinet and a partitioned or hollow top $a^3$.

A boiler $b$ heated by a gas burner $c$ is disposed beneath the cabinet, the upper surface of the boiler being in contact with the bottom plate $a^4$ of the cabinet.

A pipe $d$, leading from the steam space $b'$ at the top of the boiler, connects the said space with one end of the interior of the hollow shelf $a^2$ and a pipe $d'$ connects the same end of the hollow shelf $a^2$ with one end of the hollow top plate $a^3$ of the cabinet.

At the other end of the hollow top plate $a^3$ from the pipe $d'$, a pipe $e$ connects the top plate with the hollow shelf $a^2$, and another pipe $e'$ at the same end of the hollow shelf as the pipe $e$ connects the shelf with a pipe $e^2$ leading into the water space of the boiler.

A pipe $f$ leads from the pipe $d$ into the upper end of an annulus $g'$ surrounding a chamber $g$ containing a float $h$, see Fig. 2 or Fig. 3, openings such as $g^2$ (Fig. 2) affording communication between the lower end of the annulus and the lower end of the chamber. In the arrangement shown at Fig. 2, a rod $h'$ connected with the float $h$, is connected to a diaphragm $i$, the peripheral portion of which is anchored between collars $i^2$, $i^2$. Associated with the diaphragm is a valve member $j$ adapted to blank off or to open up as the case may be communication between a gas supply pipe $k$ and a pipe $m$ leading to the gas burner $c$.

When the apparatus is working normally, the upward pressure of the float $h$, occasioned by the action of the pressure in the steam space of the apparatus, on the surface of the liquid in the annulus $g'$ keeps the control valve $j$ in a determined position of opening against the pressure of the gas supply. If the steam pressure in the system falls, the gas supply pressure plus the weight of the float overcomes the upward pressure on the float and opens the control valve further, thus increasing the gas supply.

Instead of the cabinet having a hollow top $a^3$ through which steam is conducted as described with reference to Fig. 1 it may have a plain metal top or one consisting of a single metal sheet $a^5$, as shown in Fig. 5, in which case the top will have a lower temperature than in the Fig. 1 arrangement. Alternatively, the cabinet may have, as shown in Fig. 6, a top consisting of spaced plates $a^6$, $a^6$, with the space between them filled with heat-insulating material $a^7$, in which case the top of the cabinet will remain cold.

When the apparatus is being started up, it is necessary that the air contained in the steam space shall be permitted to escape. To this end I provide what I call a "breather" in the form of a vertical or substantially vertical coil $n$ (see Fig. 4) of tubing of suitable bore and length. The lower end of the coil $n$ is connected to the pipe $e'$ leading back to the boiler and its upper end $n'$, which may be disposed at any suitable height is open to the atmosphere. When the system is started up and steam is generated in the boiler, it drives before it the air contained in the steam space and expels it through coil $n$. When all the air has been expelled and steam begins to pass through the coil it condenses in the upper part of the coil, and the condensate runs down and collects in the lower part of the coil to form a hydraulic seal, the collected condensate being supported by the pressure existing in the lower part of the coil. If the steam pressure becomes unduly high it blows out the condensate from the top of the coil and thus relieves the pressure in the system. When the system is shut off, the condensate automatically runs out of and empties the coil, leaving the "breather" ready to operate again when the system is again put into operation. There is thus no danger of an unduly heavy seal forming which might result in development of an unduly high pressure in the system.

In order to prevent any possibility of liquid being sucked out of the annulus $g'$ and float chamber $g$ by creation of a vacuum due to shutting down of the system, a vertical pipe $p$ having its upper end open to the atmosphere, has its lower end $p'$ bent horizontally to enter the pipe $e'$ at about the same level as the pipe $e^2$ leading back from the system to the boiler. If any tendency towards formation of a vacuum in the system should occur, the pipe $p$ will become unsealed and will admit atmospheric air before any sufficient degree of vacuum is formed to cause withdrawal of liquid from the float chamber.

The pipe $p$ also acts as a low-water alarm since, if the water level drops too low, it becomes unsealed and the emission of steam indicates the necessity for water replenishment, which may be effected through a pipe $r'$ in the upper end of a water gauge $r$ connected by a pipe $r^2$ to the pipe $e^2$.

When using the diaphragm type of gas-control means shown in Fig. 2 with a high-pressure gas supply the pressure of the gas on the diaphragm itself opposes the lifting motion of the float, and a sufficiently high gas pressure will prevent the float from lifting. In the gas-control means shown in Fig. 3 the use of a diaphragm is dispensed with. The gas supply pipe $k$ is connected to a valve body $s$ having a tubular passage $s'$ within which a valve member $s^3$ carried by the float rod $h'$ is slidable vertically. A lateral outlet passage $s^2$ in the valve body $s$ is connected to the gas outlet pipe $m$, such passage $s^2$ being blanked off or closed by the upper end of the valve member $s^3$ when the pressure in the system reaches the determined maximum and being opened when the pressure falls below the determined minimum.

At a point suitably below the outlet passage $s^2$ the tubular passage $s'$ opens into a chamber $t$ of appropriate capacity from which an outlet $t'$ of determined area leads to the gas outlet pipe. Below the chamber $t$ the valve rod $h'$ passes slidably through an opening $s^4$ in the bottom of the valve body $s$, which opening $s^4$ may, if desired, be fitted with a bushing.

The valve member $s^3$ may have an easy sliding fit in the two passages $s'$ and $s^4$ in the valve body $s$ through which it works.

The area of the outlet $t'$ from the chamber $t$ is such that leakage of gas downwardly past the upper end of the valve rod $h'$ cannot cause any pressure to build up in the chamber $t$, so that no perceptible leakage takes place downwardly through the opening or passage $s^4$. This construction just described provides a substantially frictionless gas-control device which is extremely sensitive and is not subject to the disadvantages of a control device in which a diaphragm is employed, as in Fig. 2.

A depending skirt $a^3$ extends down below the bottom of the cabinet and serves to confine and spread the heat from the gas burners over the whole bottom plate of the cabinet.

It will be observed that no flame comes into contact with the bottom plate of the cabinet, nor does any flame or gas-heated air enter the cabinet. The bottom plate of the cabinet does not at any time get so hot as to make it into a cooker. The centre shelf $a^2$ of the cabinet, being steam heated, will act as a cooker for comestibles placed thereon in metal pans or containers.

In Fig. 1 the pipes $d$, $d'$, and $e$, $e'$, are shown as being spaced from the walls of the cabinet. It will be understood that in actual practice they will be close up to the walls and may be in the form of flues, so as not to waste any space.

Among other advantages a cabinet according to the invention presents the following: It gives a greater uniformity of heat throughout the whole cabinet due to the steam-heating of the central shelf; it provides a maximum capacity for storage of food in the ideal temperature, since there are no "too hot" or "too cold" spots; it furnishes a valuable addition to cooking facilities by reason of the steam-heating of the centre shelf permitting of slow cooking theereon; and due to the uniformity of heat and the evenness of temperature throughout the cabinet it enables food to be kept in better condition for longer periods than hitherto.

Having thus described my invention, what I claim as new and desire to secure by Letters Patent is:

A float controlled valve for a fluid conduit comprising a float chamber, a float in said chamber, a valve stem carried by said float and extending vertically above the same, a valve body, fluid inlet and outlet conduits opening into said valve body, said body including a valve seat receiving the upper end of said valve stem to close said valve, the liquid level in said chamber normally being such as to maintain said valve open, means for raising said liquid level to actuate said float to close said valve, said valve body comprising a vertical fluid passage directly connected to said inlet conduit, said valve stem being slidable in said passage, said passage having a lateral outlet in direct communication with said outlet conduit, said stem being operative to close said lateral outlet when said stem is raised by said float, and a leakage chamber surrounding said stem below the lateral outlet, said leakage chamber being in direct communication with said outlet conduit.

EDWARD BANKS, Jr.